United States Patent
Armstrong et al.

(10) Patent No.: US 7,421,482 B2
(45) Date of Patent: *Sep. 2, 2008

(54) METHOD AND SYSTEM FOR PROVIDING RICH MEDIA CONTENT OVER A COMPUTER NETWORK

(75) Inventors: Brooke Allysoun Armstrong, Berkeley, CA (US); John Robert Behrens, Emeryville, CA (US); Abie Hadjitarkhani, San Francisco, CA (US); Alexander Blair Ireland, East Norriton, PA (US); Stephen John Muller, San Francisco, CA (US); Nancy Kiyoko Narimatsu, Brisbane, CA (US)

(73) Assignee: eBay, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/184,774

(22) Filed: Jul. 20, 2005

(65) Prior Publication Data
US 2005/0256941 A1 Nov. 17, 2005

Related U.S. Application Data

(63) Continuation of application No. 09/693,867, filed on Oct. 23, 2000, now Pat. No. 6,985,934.

(51) Int. Cl.
*G06F 13/00* (2006.01)
(52) U.S. Cl. .......... 709/219; 709/225; 719/329
(58) Field of Classification Search ........... 709/217, 709/219, 223, 224, 225; 719/328, 329
See application file for complete search history.

(56) References Cited

U.S. PATENT DOCUMENTS 5,187,787 A 2/1993 Skeen et al.
5,305,195 A 4/1994 Murphy (Continued)

FOREIGN PATENT DOCUMENTS

EP 0 996 253 A2 4/2000
WO WO 97/07656 3/1997

(Continued)

OTHER PUBLICATIONS

"Detecting the Presence/Version of QuickTime from Web Browsers on Windows", *QuickTime 4.1./4.1.2*, (Updated on May 1, 2000), 6 Pages.
"BrowserSpy", (Copyright: 1995-2000).

(Continued)

*Primary Examiner*—Viet Vu
(74) *Attorney, Agent, or Firm*—Schwegman, Lundberg & Woessner, P.A.

(57) ABSTRACT

The invention presented here is a method and system for providing rich media content over a computer network. In accordance with the invention, a server on a physical or wireless computer network polls the software, hardware, or appliance of an end user on the network, for the availability of software and/or hardware necessary for the display of rich media content. This polling is transparent to the end user and requires no action on the part of the end user. Based on the client's response, the server sends an appropriately formatted version of the rich media file. The user is not necessarily aware that this transfer is taking place, as it is taking place in the background, while the user is performing other tasks or viewing content other than that which is being transferred. Once the rich media has been transferred in its entirety and stored, or cached, in the local memory of the client, the rich media content is displayed automatically in a designated display area. The user may then be able to manipulate the rich media content without affecting the other content or tasks that were being displayed prior to the display of the rich media content.

20 Claims, 8 Drawing Sheets

U.S. PATENT DOCUMENTS

| | | | |
|---|---|---|---|
| 5,347,632 | A | 9/1994 | Filepp et al. |
| 5,515,490 | A | 5/1996 | Buchanan et al. |
| 5,572,643 | A | 11/1996 | Judson |
| 5,604,542 | A | 2/1997 | Dedrick |
| 5,666,359 | A | 9/1997 | Bennett et al. |
| 5,706,434 | A | 1/1998 | Kremen et al. |
| 5,727,184 | A | 3/1998 | Richter et al. |
| 5,737,619 | A | 4/1998 | Judson |
| 5,740,549 | A | 4/1998 | Reilly et al. |
| 5,742,602 | A | 4/1998 | Bennett |
| 5,848,415 | A | 12/1998 | Guck |
| 5,872,781 | A | 2/1999 | Bennett et al. |
| 5,898,833 | A | 4/1999 | Kidder |
| 5,903,673 | A | 5/1999 | Wang et al. |
| 5,905,885 | A | 5/1999 | Richter et al. |
| 5,913,040 | A | 6/1999 | Rakavy et al. |
| 5,914,712 | A | 6/1999 | Sartain et al. |
| 5,917,816 | A | 6/1999 | Jacobsohn |
| 5,933,811 | A | 8/1999 | Angles et al. |
| 5,936,960 | A | 8/1999 | Stewart |
| 5,937,392 | A | 8/1999 | Alberts |
| 5,951,639 | A | 9/1999 | MacInnis |
| 5,953,506 | A | 9/1999 | Kalra et al. |
| 5,956,716 | A | 9/1999 | Kenner et al. |
| 5,956,729 | A | 9/1999 | Goetz et al. |
| 5,987,510 | A | 11/1999 | Imai et al. |
| 5,999,912 | A | 12/1999 | Wodarz et al. |
| 6,006,197 | A | 12/1999 | D'Eon et al. |
| 6,006,241 | A | 12/1999 | Purnaveja et al. |
| 6,006,265 | A | 12/1999 | Rangan et al. |
| 6,009,410 | A | 12/1999 | LeMole et al. |
| 6,014,694 | A | 1/2000 | Aharoni et al. |
| 6,018,765 | A | 1/2000 | Durana et al. |
| 6,023,714 | A | 2/2000 | Hill et al. |
| 6,029,200 | A | 2/2000 | Beckerman et al. |
| 6,035,339 | A * | 3/2000 | Agraharam et al. .......... 709/246 |
| 6,044,408 | A | 3/2000 | Engstrom et al. |
| 6,088,732 | A | 7/2000 | Smith et al. |
| 6,092,114 | A * | 7/2000 | Shaffer et al. ................ 709/232 |
| 6,248,946 | B1 | 6/2001 | Dwek |
| 6,288,716 | B1 * | 9/2001 | Humpleman et al. ......... 715/733 |
| 6,314,451 | B1 * | 11/2001 | Landsman et al. ........... 709/203 |
| 6,317,761 | B1 | 11/2001 | Landsman et al. |
| 6,317,789 | B1 | 11/2001 | Rakavy et al. |
| 6,345,279 | B1 * | 2/2002 | Li et al. .................... 707/104.1 |
| 6,415,327 | B1 | 7/2002 | Beckerman et al. |
| 6,442,529 | B1 | 8/2002 | Krishan et al. |
| 6,442,758 | B1 | 8/2002 | Jang et al. |
| 6,466,967 | B2 | 10/2002 | Landsman et al. |
| 6,496,857 | B1 | 12/2002 | Dustin et al. |
| 6,516,338 | B1 | 2/2003 | Landsman et al. |
| 6,564,380 | B1 | 5/2003 | Murphy |
| 6,594,699 | B1 | 7/2003 | Sahai et al. |
| 6,631,498 | B1 * | 10/2003 | McCauley et al. .......... 715/517 |
| 6,738,803 | B1 * | 5/2004 | Dodrill et al. ............... 709/218 |
| 6,823,225 | B1 | 11/2004 | Sass |
| 6,904,566 | B2 | 6/2005 | Feller et al. |
| 6,976,059 | B1 * | 12/2005 | Rogalski et al. ............. 709/218 |
| 6,983,331 | B1 * | 1/2006 | Mitchell et al. ............. 709/246 |
| 6,985,932 | B1 | 1/2006 | Glaser et al. |
| 6,985,934 | B1 | 1/2006 | Armstrong et al. |
| 6,990,514 | B1 | 1/2006 | Dodrill et al. |
| 7,085,845 | B2 | 8/2006 | Woodward et al. |
| 7,178,161 | B1 | 2/2007 | Fristoe et al. |
| 2003/0018978 | A1 | 1/2003 | Singal et al. |
| 2004/0103297 | A1 | 5/2004 | Risan et al. |
| 2005/0166136 | A1 | 7/2005 | Capps et al. |
| 2006/0026612 | A1 | 2/2006 | Lee et al. |
| 2006/0242275 | A1 | 10/2006 | Shapiro |
| 2007/0088862 | A1 | 4/2007 | Burkman et al. |
| 2007/0100787 | A1 | 5/2007 | Lim et al. |

FOREIGN PATENT DOCUMENTS

| | | |
|---|---|---|
| WO | WO 98/15091 | 4/1998 |
| WO | WO 99/57657 | 11/1999 |
| WO | WO 99/60504 | 11/1999 |

OTHER PUBLICATIONS

"Check Plugins", (Copyright: 1999).

"OPERAscript User and Development Manual" (Jul. 2000).

"Windows Media Player: Advanced Scripting for Cross-Browser Functionality", (Updated on Nov. 2000).

HKCL Project Group, "Hong Kong Cyber library", (Apr. 20, 2000).

Microsoft Corporation, "Adding Windows Media to Web Pages", (Dec. 2000).

Microsoft Corporation, "Detecting a Player on a Consumer's Computer for Windows Media Rights Manager 1", (Updated on Jan. 10, 2000).

* cited by examiner

METHOD AND SYSTEM FOR PROVIDING RICH MEDIA CONTENT OVER A COMPUTER NETWORK

This application is a continuation of U.S. application Ser. No. 09/693,867 filed Oct. 23, 2000, now U.S. Pat. No. 6,985,934.

BACKGROUND OF THE INVENTION

1. Field of the Invention

The present invention is directed to a method and system for providing rich media content over a computer network and more particularly to a highly reliable, transparent process for displaying high-quality online advertising imagery.

2. Related Art

Computer networks, including the Internet, are a new and rapidly growing means of communication. There are currently over 300 million network users worldwide, and that number is expected to double in less than five years according to the Computer Industry Almanac (www.c-i-a.com). Because of their numbers, and because they are believed to be high-end consumers, users of the Internet and other computer networks are an attractive audience for advertising messages. According to figures from the Internet Advertising Bureau ("IAB"; www.iab.net), expenditures for Internet advertising are growing even faster than the number of network users—at almost 25 percent per quarter—and currently total over $7 billion per year.

The current standard for Internet advertising is the banner ad, a cartoon-like color image that occupies a fixed part of a web page. Banner ads usually come in one of a small number of standard sizes, and they sometimes include crude animation created by rapidly and repeatedly superposing a small number of images in the same space. Banner ads comprise the majority of Internet advertising—historically over half of total expenditures and around three-quarters of that on discrete ads (as opposed to sponsorships) according to the IAB.

The content of a banner ad image is contained in a computer file that is interpreted and displayed by a network user's web-browser program (e.g., Netscape Navigator, Microsoft Internet Explorer). Almost all banner ad files use the GIF89a format, which can be interpreted and displayed by all major web-browser programs currently on the market.

Each banner ad's file, plus the file containing the content of the host web page itself, must be transmitted to, and stored on, a network user's computer before the complete web page (ads and content) can be displayed. There may be many—sometimes dozens—of banner ads on a page, and advertisers often demand that the page be configured to display the ads first. To keep network users from waiting too long to see the content of their pages, web page owners frequently impose limits on the size of the banner ad files they will accept. These limits, in turn, sharply constrain the appearance of banner ads, e.g., by reducing the number of images per ad or the number of items per image, or by restricting the variety of colors or level of detail in an item or image.

Such limitations have combined to reduce the effectiveness of banner ads in two ways. First, they are—and because of file size limitations must remain—crude. Because banner ads are typically simple cartoons in an environment of increasingly rich and complex media, the viewing audience is becoming less responsive to the ads. The average "click-through" rate, the rate at which viewers respond to a banner ad by "clicking" on it and being transferred to the web site advertised by the banner, is falling rapidly—by almost an order of magnitude during the past five years, according to contemporary estimates in Advertising Age magazine. Secondly, despite limitations on their file sizes, banner ads often delay viewing of web page content to the point that users routinely redirect their browsers away in frustration; the very presence of the ads lowers their own viewership. Dwell-time, a measure of the time an average network user spends looking at a single page, is also declining.

In brief, banner ads, though they dominate advertising on the Internet and are so much the standard that they are directly interpretable by every major web-browser program, are an obsolete and increasingly self-defeating technology.

Advertisers, aware of the limitations of banner ads, have tried two approaches to improve upon them. The first approach is to replace the cartoon-like banner ad images with video ads, i.e., online ads that use moving, photographic-quality images rather than simple single images or series of a few simple single images. The second approach, referred to generally as interstitial ads, sometimes called pop-up ads, avoids some of the technical problems of banner ads and video ads by effectively separating the interstitial ads from their host web pages. Both approaches, though, like the banner ad approach, have run into technical and consumer-response barriers.

Video ads, unlike GIF89a-format images, cannot be displayed directly by web-browser programs. Instead, they are encoded in one of several specialized formats (e.g., MPEG, QTF, AVI) and are displayed by separate—and similarly specialized—video replay programs. Such video replay programs are separate from the web-browser programs, but they are compatible with the browsers and sometimes are referred to as plug-ins to the browsers. Some replay programs are distributed with computer operating systems, while others are available separately, either for free or at a cost. Some replay programs can interpret more than one format, although none can interpret even a large minority of the existing variety of formats, and file formats are different enough that any multi-format program is essentially a package of single-format programs. Because of the multiplicity of formats and distribution methods, and because many formats are in fairly wide use, it is unlikely that any single standard will emerge in the near future. In other words, unlike GIF image technology, the technology of computer video replay is non-standardized and is functionally complicated, and it is likely to remain so.

To view a video, a user's computer must receive at least part of the file and then activate and run a compatible replay program. This process frequently includes one or more "dialogues" between the computer and the user. For example, if the file is to be stored and then replayed, the user must specify a storage name (or approve the computer's choice) and then activate the replay. If the computer cannot determine which replay program to use, the user must specify it. And if there is no compatible replay program on the computer, the user must either cancel the replay or spend time (and possibly money) identifying, locating, and obtaining one. The complexity and time requirements of this process can be daunting even if the user actively seeks to view the video; for advertising, which needs to be entirely passive and nearly instantaneous, these are major barriers.

Another barrier to the use of video ads is imposed by the sheer size of most video files. Video images, like any other computer data, are stored and transmitted as computer files. Because of the complexity of the images (color, resolution, etc.) and the number of images in a file (usually thousands), video files typically are very large. For example, a word-processing document file may be on the order of a few dozen kilobytes (KB), and a typical web page file may be around a hundred KB, but even a thirty-second video will require a file size of thousands of KB (i.e., several megabytes, or MB). Using a standard telephone modem connection, whose transmission rate is limited by telephone technology and federal regulation, not by computer modem technology, a file of even a few megabytes can require many minutes to receive and store. For example, with a 56K modem and an effective transmission rate of over 50K, transmission requires at least three minutes per megabyte. Faster connections (e.g., via DSL or institutional intra-net) reduce this time substantially, but not so much that the file transmission does not cause a noticeable interruption. Further, those types of connections are available to only a portion of the user population. As noted above, computer users are becoming increasingly impatient with any delay, especially for the sake of advertising, and in any case most advertisers are unwilling to limit their messages to only a portion of the population.

To address the problem of file size, specialized protocols were developed that allow near-real-time playback. Sometimes called streaming, these protocols begin playback when only a portion of the file has been transmitted and stored on the user's computer (i.e., buffered). Later portions of the file are transmitted as earlier ones play back, and the parameters of the process are calibrated so that, if transmission is not interrupted, playback is continuous. The practical flaw in this approach is that transmission, particularly of large files, frequently is interrupted. Net congestion, transmission errors requiring retransmission, competing demands on the transmitting computer, and other causes, can interrupt the transmission flow long enough that the buffer is completely played out, and then playback stops until enough new data have been received. The effect on the user is that streaming video (or audio) either is occasionally interrupted by long pauses or has a jerky quality caused by frequent micro-pauses (the former with a large buffer size and the latter with a small one). These types of interruptions are unacceptable to advertisers, whose imagery requires seamless replay. Further, streaming video is subject to the same requirements as non-streaming video for identifying, obtaining, and/or activating a compatible replay program.

U.S. Pat. No. 6,029,200 to Beckerman et al. discloses a process that uses streaming video and provides a more automated approach to selecting a replay program. The "client" computer (e.g., the network user's computer) is offered a list of multiple versions of a video file, each in a different format, in a predetermined order, until a compatible format—if any—is found. This makes it more likely that the video eventually can be viewed by the user, but it requires the user's computer to know how to interpret and choose among the list of "offers," which presumably requires specialized software. It is not clear how noticeable the process would be to the user (e.g., delay, "dialogues"), and because it applies only to streaming video, the process does not address the problem of interruptions in playback. It thus can be considered another format, albeit a somewhat generalized one, but with questionable application to advertising.

Processes developed more recently by bluestreak.com, Inc. (www.bluestreak.com) and AudioBase, Inc. (www.audiobase.com) also use streaming, and they circumvent the replay compatibility issue by transmitting their own replay programs along with the data files. These are examples of the usage of "push" technology, as used, e.g., in U.S. Pat. No. 5,740,549, issued Apr. 14, 1998 to Reilly et al. These processes are reasonably rapid—although still noticeable to the user—because neither handles full video; bluestreak offers audio, GWF-like animation, and other cartoon-like special effects, and AudioBase handles strictly audio. Both also are subject to the problems of streaming, such as "stuttering" and interruptions in playback. They thus are suitable for certain narrow, specialized forms of advertising, but their transmission delays are still non-negligible, and like other uses of streaming, their unreliable replay renders them problematic for advertising.

In summary, attempts to date to put video advertising onto Internet web pages have largely failed because of two fundamental technical characteristics of computer video—lack of standardization and very large file size—and their implications. Computer users are generally unwilling either to wait for large files to be transmitted or to take active steps to ensure a smooth replay, especially for the sake of viewing an advertisement. Advertisers are unwilling to spend money and effort on technologies that cannot reliably deliver uninterrupted imagery to a wide audience. What would satisfy both users and advertisers, but is lacking in the prior art, is a means for reliably delivering video ads without any interruption of the user's viewing experience. As a consequence, video advertising has been and remains a small and static fraction of all Internet advertising; expenditures on video have consistently been just a few percent of the total.

Interstitial advertisements—sometimes called pop-up ads—bypass some of the technical problems of on-page banner ads and video ads by effectively separating the online ads from their host web pages. The content of an interstitial ad is transmitted separately from those of its host web page. Transmission begins immediately after the host web page has been fully transmitted and while it is being displayed (i.e., during the "interstices" between other web page transmissions), and it may continue once the ad itself has begun displaying. The ad is displayed in a new "window" or other dedicated display area, either immediately after the host page is fully displayed (thus "popping up" in front of the host page) or when the user signals that he/she has finished reading the host page by closing it or activating a link to a new page. Interstitial ads can include GIF images, video, audio, or any other web page elements; they are essentially specialized web pages comprised entirely of advertising. Because they are transmitted separately, they do not delay the display of the host web page, and because the user presumably is occupied for some time reading the host web page, the ads can take much longer to transmit than on-page ads without seriously annoying the user.

Interstitial transmission of advertising is taught in U.S. Pat. No. 5,305,195, issued Apr. 19, 1994 to Murphy, for use on specialized computer terminals such as bank ATMs and school registration stations. More recent applications include U.S. Pat. No. 5,913,040, issued Jun. 15, 1999 to Rakavy et al.; U.S. Pat. No. 5,737,619, issued Apr. 7, 1998 and U.S. Pat. No. 5,572,643, issued Nov. 5, 1996, to Judson; and U.S. Pat. No. 5,604,542, issued Feb. 18, 1997 to Dedrick.

The principal problem with interstitial ads is that, as dwell time statistics show, users' patience still limits the time available for transmission. While a user is reading the host page, there typically is sufficient download time for banner ads, other GWF images, other static images, simple animations, a streaming video buffer, and usually audio and other animated elements and associated programs such as those produced by the bluestreak and AudioBase processes. However, there is not sufficient time to transmit more than one buffer worth of a video file, and there is no opportunity to create a "dialogue" with the user until the interstitial ad is displayed. Consequently, both the number and the type of elements in an interstitial ad are constrained. Additionally, interstitial video ads are also subject to the same problems of non-standardization and display reliability as with on-page video ads.

A process developed by Unicast Communications Corp., disclosed in International Publication No. WO 99/60504, published Nov. 25, 1999, partially addresses these problems by installing a program on the user's computer that ensures that transmission of ads (and accompanying playback programs if any) is as "polite" as possible. The concept of "polite" transmission—i.e., file transmission minimally noticeable to the user—avoids some of the problems associated with streaming by fully storing (or caching) ads on the user's computer before displaying them. The Unicast program also checks that any necessary playback programs are available on the user's computer before the ad is displayed. However, such a process is not practically applicable to video ads, because large files take a long time to transmit no matter how politely, and video replay programs are even larger than video ads and are seldom available for transmission along with them. It is also as yet unclear whether such a powerful program will be fully compatible with most network users' operating systems and browser programs, or whether privacy concerns will limit its functionality or popularity.

Overalls while interstitial ads solve some of the problems of computer network advertising, they as yet have shown only partial success at dealing with the non-standardization and file size issues associated with video ads, or with file sizes in general. Attempts to create a "smart" solution have only added new problems. At least partially as a result, interstitials historically have accounted for less than a tenth of Internet advertising expenditures, and that share has shrunk by almost half in the last year according to the IAB.

In summary, what is needed but is missing in the prior art, is a highly reliable, entirely transparent process for displaying high-quality rich media content over a computer network.

SUMMARY OF THE INVENTION

The present invention is directed to a method, system and computer program product for providing rich media content over a computer network. In accordance with the present invention, a server on a computer network polls the software, hardware, or electronic appliance of an end user on the network, for the availability of software and/or hardware necessary for the local display of rich media content. This polling is transparent to the end user and requires no action on the part of the end user. Based on the client's response, the server sends an appropriately formatted version of the rich media file to the client. The user is not necessarily aware that this transfer is taking place, as it is taking place in the background, while the user is performing other tasks or viewing other content than that which is being transferred. Once the rich media has been transferred in its entirety and stored, or cached, in the local memory of the client, the rich media content is displayed automatically, either immediately or according to a predefined schedule or display cue, in a designated display area. The user may then be able to manipulate the rich media content without affecting the other content or tasks that were being displayed prior to the display of the rich media content.

The client may be any of a number of known electronic devices connected either physically or wirelessly to a server on the computer network. Such devices may include, but are not limited to, a desktop computer, a laptop computer, a handheld device, a telephone, a set top box, or an Internet appliance. In the preferred embodiment, the rich media comprises a short, highly compressed digital video file. For example, such rich media may be a 5-15 second long video advertisement.

DETAILED DESCRIPTION OF THE PREFERRED EMBODIMENTS

A preferred embodiment of the present invention is now described with reference to the figures, where like reference numbers indicate identical or functionally similar elements. Also in the figures, the left most digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other devices and applications.

Figure 1A:
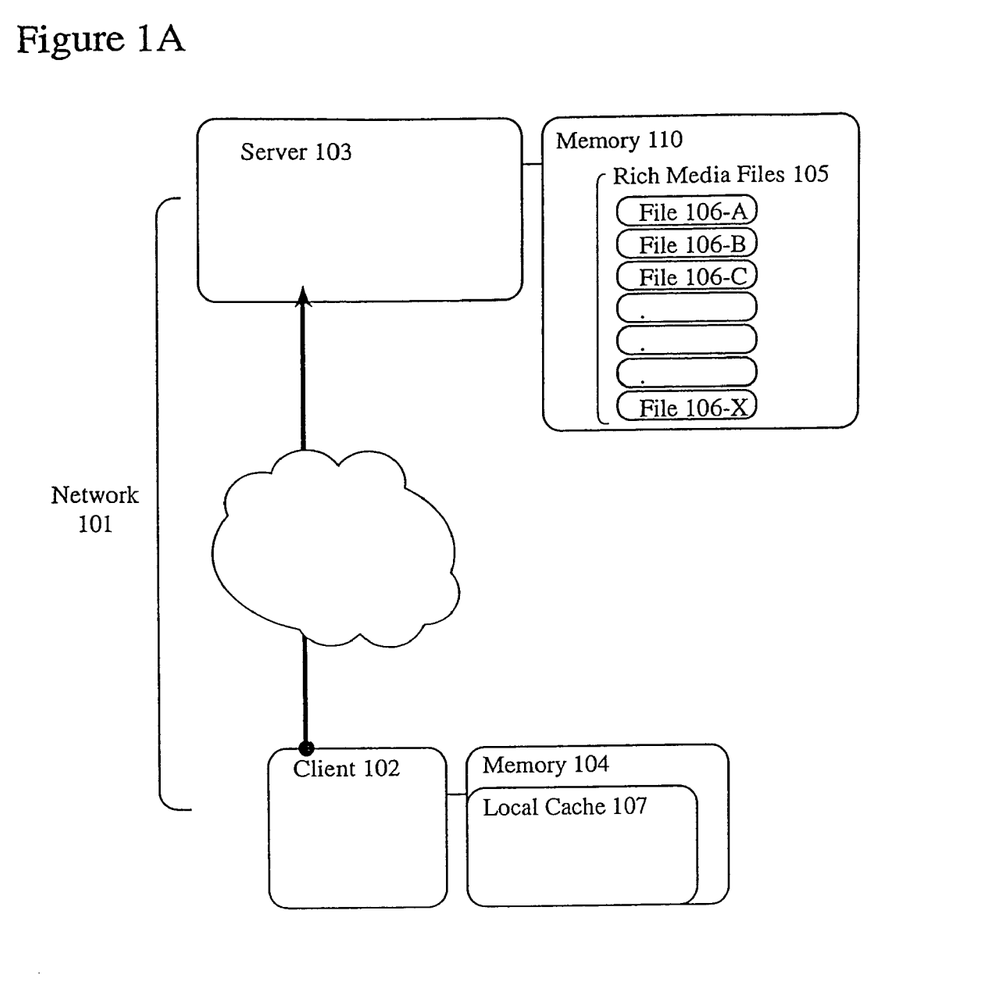
FIGS. 1A-1E show a computer network according to the present invention at various steps during a method for providing rich media content across a computer network according to the present invention.

FIG. 1A shows a computer network 101 according to the present invention, consisting of a system of electronic devices connected either physically or wirelessly, wherein digital information is transmitted from one device to another. Such devices may include, but are not limited to, a desktop computer, a laptop computer, a handheld device, a telephone, a set top box, or an Internet appliance. FIG. 1A shows a client 102, defined as a computer program resident on a computer system, an item of hardware, or an electronic appliance that sends and receives digital information via computer network 101. Also shown is a server 103, defined as a computer program resident on a computer system, an item of hardware, or an electronic appliance that sends and receives digital information via computer network 101. The role of server 103 shown in FIG. 1A may in some cases be played by more than one actual server, as would be apparent to those skilled in the relevant art.

Server 103 also includes a memory 110 which stores digital files, including but not limited to software and data files. Specifically, memory 110 may contain one or more rich media files 105, defined as any electronic media content that includes moving images, video with or without audio, a sequence of images captured from frames of film, frames of video, or animated shapes. "Rich", in general, denotes electronic media information that includes more than only text or audio. Rich media files 105 are stored in the form of digital computer files. In the preferred embodiment, rich media, file 105 is a 5-10 second video advertisement in the form of a highly compressed electronic file. Rich media files 105 can be stored, transmitted or displayed using a variety of proprietary and nonproprietary electronic file formats, such as Quick-Time, Windows Media Player, GIF89a, Flash, AIFF, WAV, RealAudio, RealVideo, or any of a number of file formats now emerging for wireless devices, such as HDML, WML, BMP, or formats associated with WCA, and other formats known to those skilled in the relevant art appropriate to various software, hardware, and electronic appliance display systems. The particular file format does not substantially affect the content of rich media file 105. Rich media files 105 may be previously created and stored in memory 110, or may be created "on-the-fly" in response to the requirements of client 102. As discussed below, the same rich media file 105 is stored in a number of different file formats (106-A, 106-B . . . 106-X) in memory 110 to facilitate the transfer and display of rich media file 105 across computer network 101 according to the present invention.

Client 102 also includes a memory 104, that is entirely contained within, or is entirely a part of client 102, which stores digital files, including, but not limited to, software and data files. A subset of client memory 104, local cache 107, is defined as that portion of client memory 104 that is used for temporary storage of data files received over computer network 101.

Figure 3:
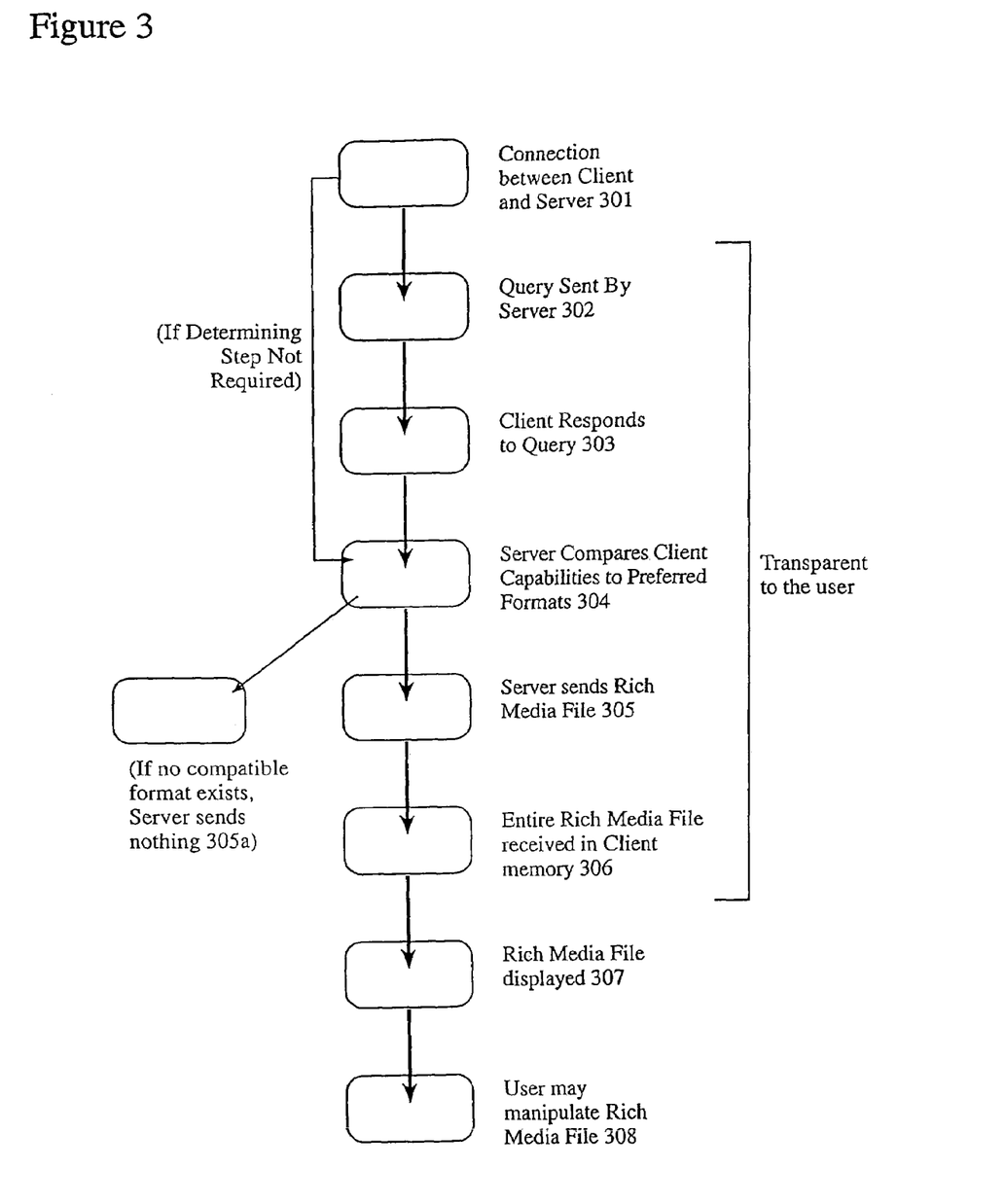
FIG. 3 is a process diagram of the method for providing rich media content across a computer network according to the present invention.

The process according to the present invention is initiated at a step 301, as shown in FIGS. 1A and 3, by client 102 becoming connected to server 103, for example a desktop computer user being connected to a web site using a web browser.

Figure 1B:
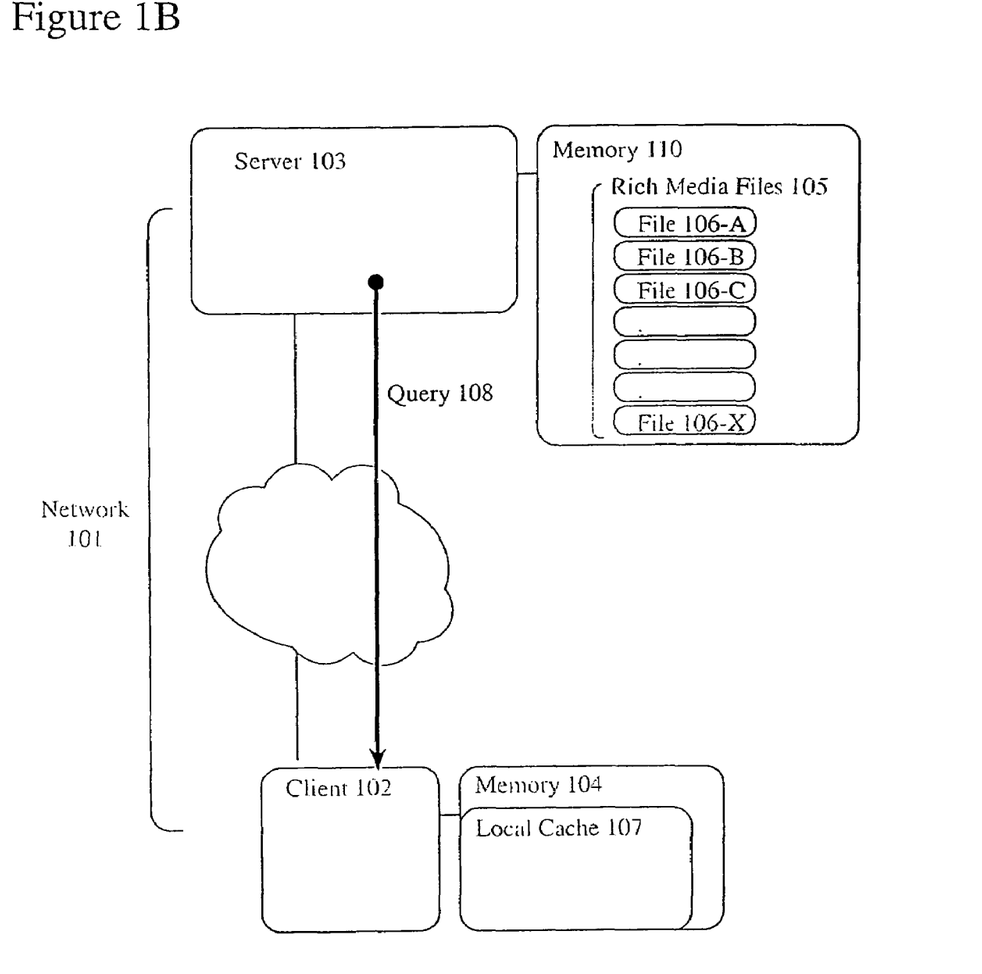

Next, at a step 302, as shown in FIGS. 1B and 3, server 103 sends a query 108 to client 102. Query 108 is a communication wherein server 103 requests data from client 102 regarding the presence or absence of specific software and/or hardware that are required to display rich media file 105, that has been prepared in specific file formats 106-A, 106-B . . . 106-X. In one embodiment, query 108 is performed by progressing, via one or more connections with client 102, through a set of preferred rich media content playback applications to assess the local playback capabilities of client 102. In the preferred embodiment, this procedure is transparent to the user, meaning that the user is not required to take action to initiate this step, and the process is not noticeable to the user.

Figure 1C:
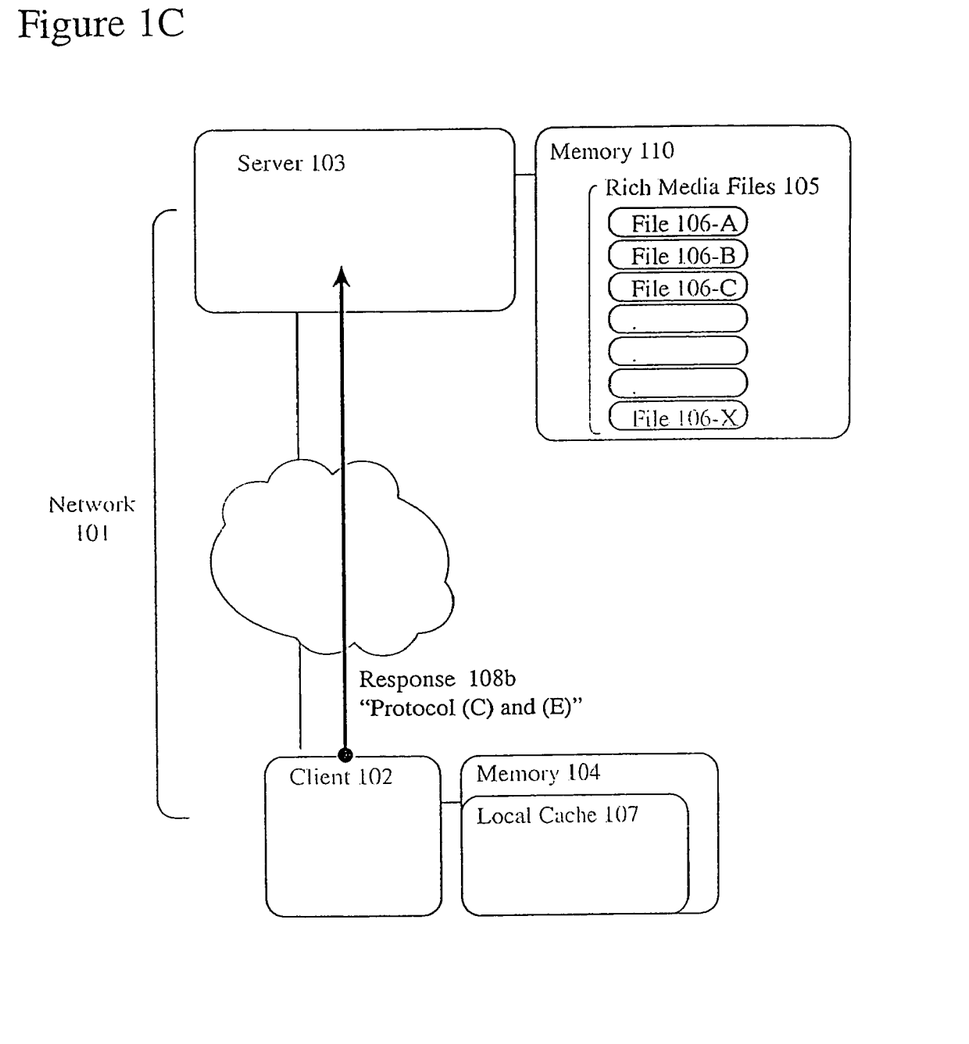

At a step 303, as shown in FIGS. 1C and 3, client 102 responds to query 108 with response 108b, indicating, for example, in the example shown in FIGS. 1A-1E, that software and/or hardware required to display rich media file 105 prepared in formats 106-C and 106-E are available. In the preferred embodiment, this procedure is transparent to the user, such that the user is not required to take action to initiate this step, and the process is not noticeable to the user.

Determining the ability of client 102 to playback rich media file 105 may, in an alternative embodiment, be implicitly accomplished, by sending rich media file 105 via a particular computer network 101, or in a particular file format, or toward a particular device or electronic appliance, where the ability of client 102 to playback rich media file 105 could be assumed. For example, in one embodiment, information about the technical environment of client 102 may be known by virtue of the connection established between client 102 and server 103 over computer network 101 (e.g. it may be known that client 102 is connected to server 103 from a computer, using a browser, over the internet, or that client 102 is connected to server 103 from a handheld device, such as a Palm VII device, over a wireless network.) If such information about the technical environment of client 102 is sufficient to make a determination of the appropriate file format in which to send rich media file 105 to client 102, steps 302 and 303 may be skipped.

Figure 1D:
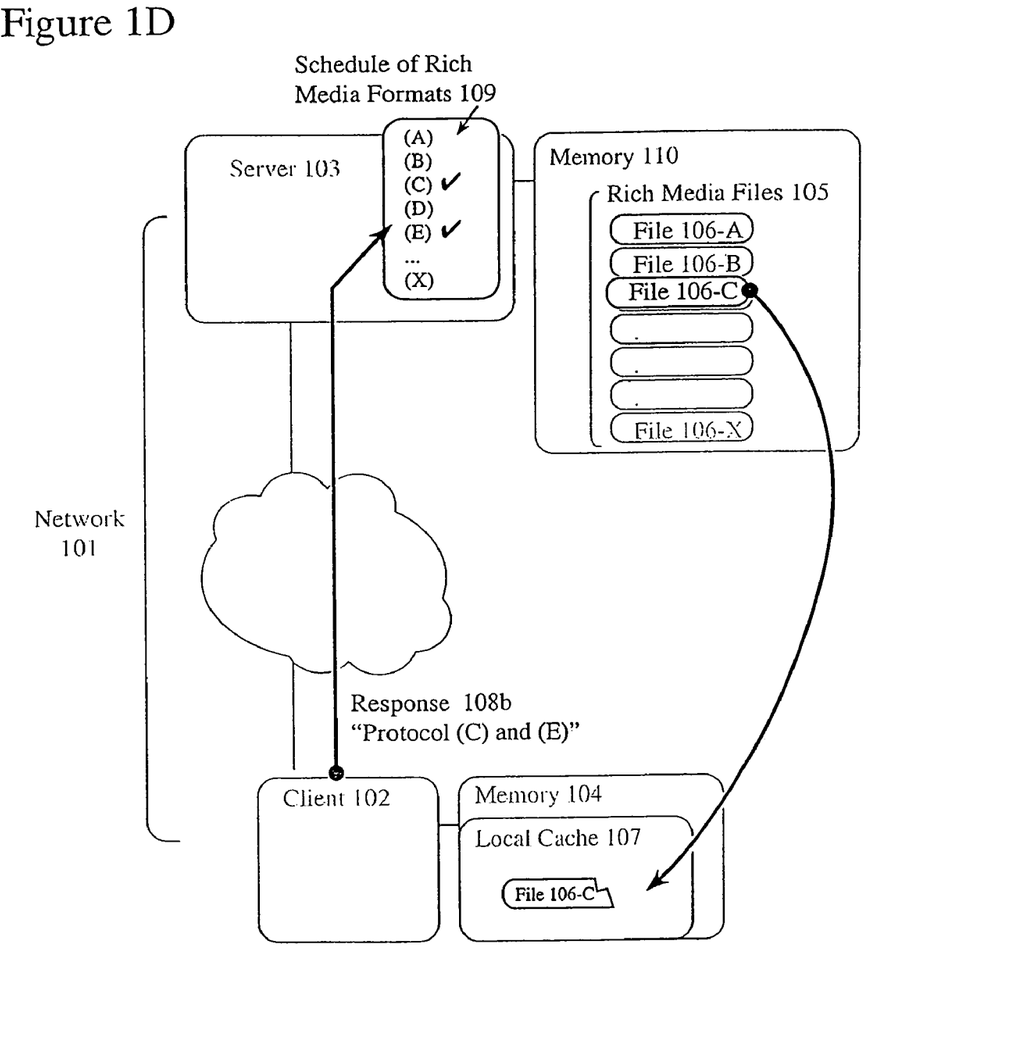

At a step 304, as shown in FIGS. 1D and 3, server 103 compares response 108b to a predefined schedule 109 of rich media file formats 106-A, 106-B . . . 106-X. Schedule 109 contains a predefined preference ranking of the various available rich media file formats 106-A, 106-B . . . 106-X. The reason a preference may exist for one file format over another is that one file format may offer the client 102 higher video quality, audio quality, speed of download, or other features, than another format. In the preferred embodiment, this procedure is transparent to the user, such that the user is not required to take action to initiate this step, and the process is not noticeable to the user. As an alternative to step 304, an appropriate format of rich media file 105 can be created "on-the-fly" by generating a script for rich media content 105 compatible with the local playback capabilities of client 102.

Based on the comparison at step 304, rich media file 105 is sent to client 102 in the preferred file format at a step 305. As shown in FIG. 1D, for example, rich media file 105 in file format 106-C is downloaded from server 103 to client 102. In the example shown in FIGS. 1A-1E, while both file format 106-C and file format 106-E were determined to be suitable for playback on client 102, because file format 106-C is ranked higher than file format 106-E in schedule 109, server 103 transfers rich media 105 in file format 106-C from memory 110 of server 103 to memory 104 of client 102. In the preferred embodiment, this procedure is transparent to the user, such that the user is not required to take action to initiate this step, and the process is not noticeable to the user.

In the preferred embodiment, in the event that response 108B from client 102 did not match any of the file formats 106-A, 106-B . . . 106-X available in schedule 109, or if response 108B from client 102 did not match any of the file formats 106-A, 106-B . . . 106-X ranked above a certain preference level, server 103 will not send rich media file 105 to client 102, as shown at a step 305a. Since the process according to the present invention, in the preferred embodiment, is transparent to the user, the user would not be aware that the transfer of rich media file 105 was unsuccessful.

Figure 1E:
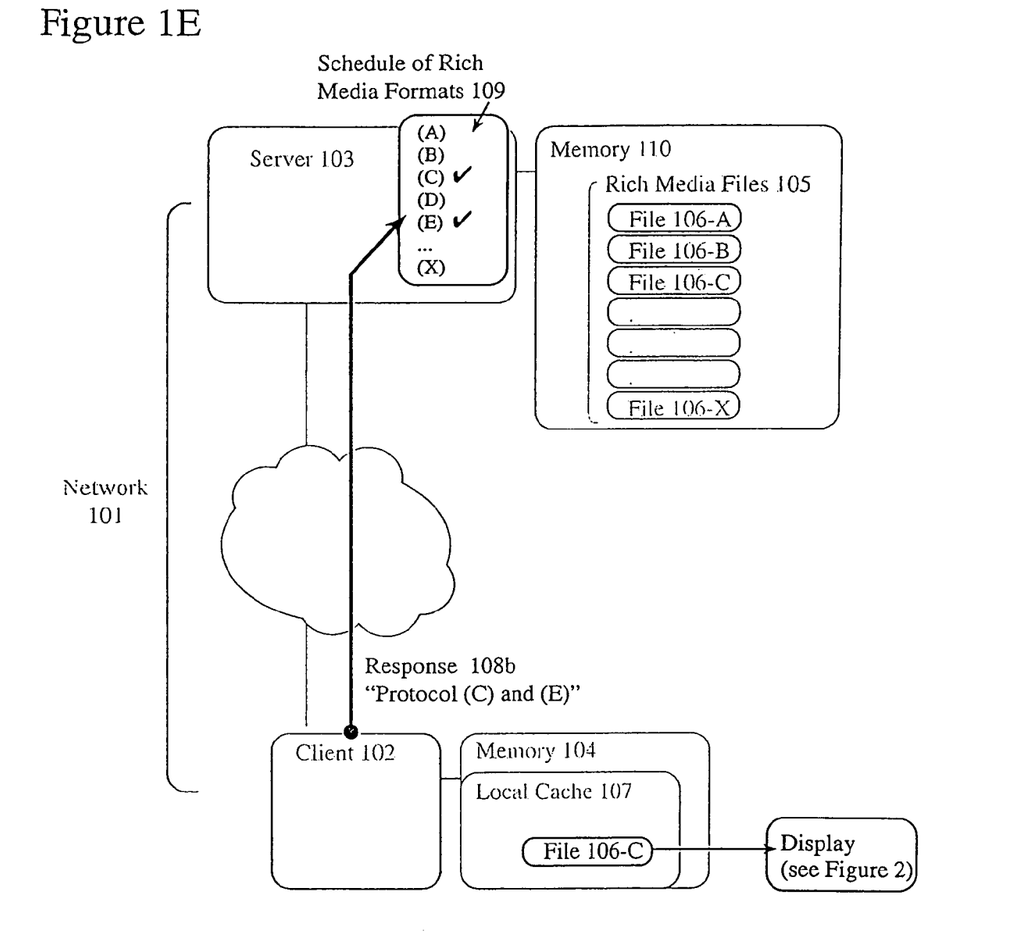
Figures 2, 2A:
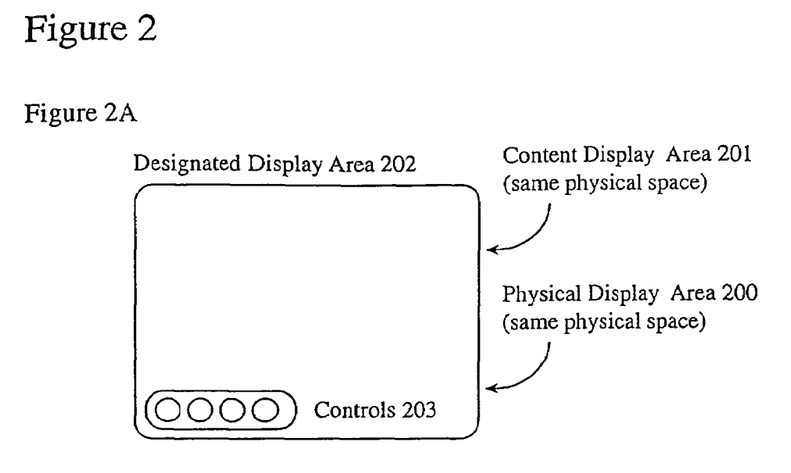
FIGS. 2A-2C are various embodiments of a client display area according to the present invention.
Figure 2B:
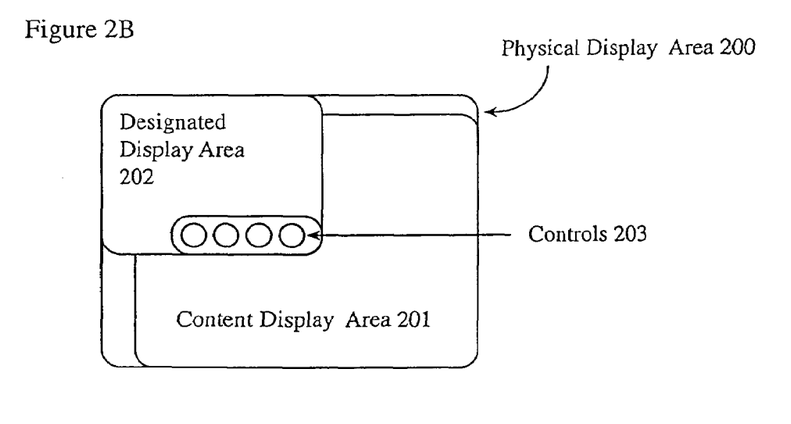
Figure 2C:
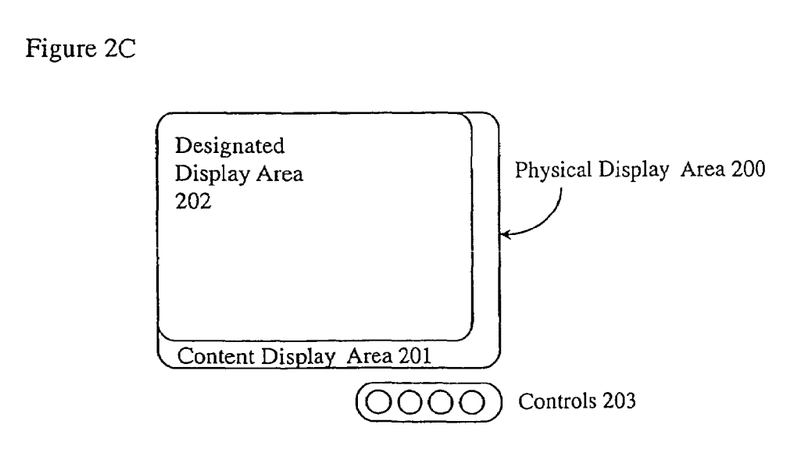

At a step 307, as shown in FIGS. 1E and 3, after the entirety of rich media file 105, in preferred file format 106-C, has been completely loaded into local cache 107 of client 102, as shown in a step 306, rich media file 105 may be displayed. For example, as shown in FIGS. 2A-2C, rich media file 105 may be displayed in a designated display area 202 of a physical display area 200 of client 102.

Designated display area 202 is defined as a region, screen, or application window that is used for displaying rich media content 105, and is distinct from content display area 201, previously being viewed by a user in physical display area 200. Physical display area 200 is the total area of an electronic device which is dedicated to and available for displaying information, such as a computer's monitor or a cellular phone's LCD display screen, whereas content display area 201 is defined as the part of physical display area 200 actually being used to display content at a given moment. In the case of a small handheld device, display areas 201 and 202 may occupy the same physical space (e.g. the entirety of physical display area 200) as shown in FIG. 2A, or all or part of a "layer" of visual content within physical display area 200, as shown in FIGS. 2B and 2C, superimposed over a portion of a preexisting content display area 201 (e.g. a main browser window) of client 102.

Regardless of the physical space occupied by rich media content 105, the designated display area 202 is separate in the sense that it can be manipulated (replayed, dismissed, forwarded to another user, etc.), as described below, without affecting the remainder of the content being viewed by the user. As shown in FIGS. 2A-2C, controls 203 may be provided for manipulating rich media content 105 at a step 308. Controls 203 may be implemented in a variety of manners, including but not limited to, mechanical buttons, onscreen representations of buttons, onscreen menus, keystrokes, pen-based input methods, voice commands, ocular movements, a menu bar, navigation bar, or toolbar. Types of manipulation that might be performed may include the ability to replay; to turn any associated sound on or off; to turn any associated video on or off; to close or dismiss rich media content 105; to respond to rich media content 105 by redirecting the software, hardware, or electronic appliance to another source for electronic information on computer network 101; to respond to rich media content 105 by acknowledging receipt; to respond to rich media content 105 by answering a question; and/or to store rich media content 105 or a reference to rich media content 105 for future viewing by user. Additionally, rich media content 105 or a reference to rich media content 105 may be forwarded to another user by entering the email address, location, address, or other contact information for such other user, either manually or through referencing a list of predetermined recipients. Forwarding may mean simply including the sending of a reference to rich media content 105 (such as a URL, an alias, a pointer, or other means of locating files on a computer network), or the actual transfer of rich media file 105 to the other user. In the context of online advertising, forwarding to additional users increases the overall exposure to the advertisement's message. Therefore, a user may be encouraged to forward rich media content 105, for example, by the amusing or entertaining nature of rich media content 105, or through incentives, premiums or discounts offered for forwarding. Additionally, the address or coordinates of recipients of rich media 105 may be stored on computer network 101 (e.g. in a database on server 103), for future use by advertisers to target specific groups of individuals.

Figure 4:
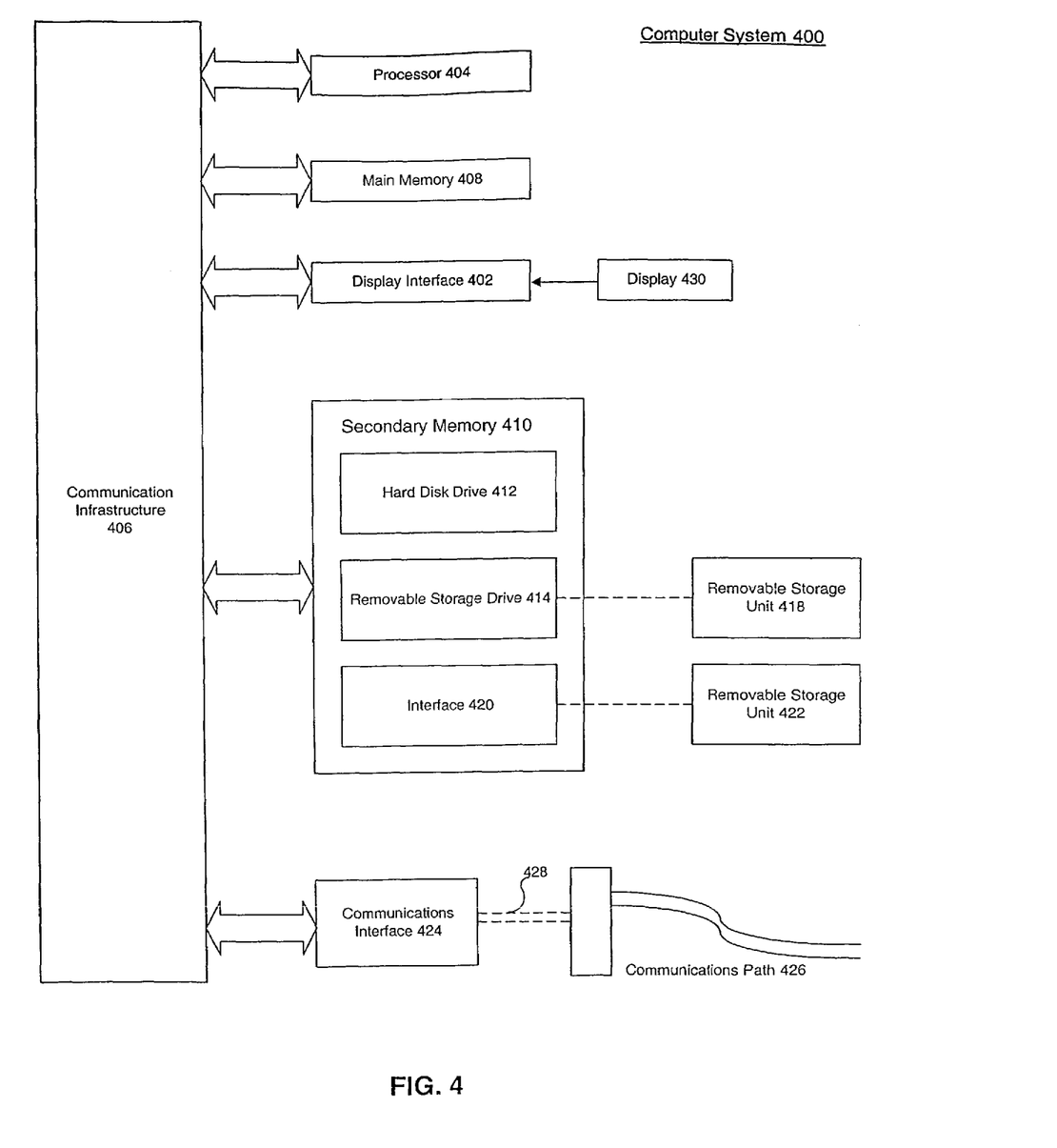
FIG. 4 is a block diagram of an example computer system useful for implementing the present invention.

The present invention may be implemented using hardware, software or a combination thereof and may be implemented in one or more computer systems or other processing systems. An example computer system 400 useful in implementing the present invention is shown in FIG. 4. The computer system 400 includes one or more processors 404. Processor 404 is connected to a communication infrastructure 406 (e.g., a communications bus, cross-over bar, or network). Various software embodiments are described in terms of this exemplary computer system. After reading this description, it will become apparent to a person skilled in the relevant art how to implement the invention using other computer systems and/or computer architectures.

Computer system 400 may include a display interface 402 that forwards graphics, text, and other data from the communication infrastructure 406 (or from a frame buffer, not shown) for display on a display unit 430.

Computer system 400 also includes a main memory 408, preferably random access memory (RAM), and may also include a secondary memory 410. The secondary memory 410 may include, for example, a hard disk drive 412 and/or a removable storage drive 414, representing, for example, a floppy disk drive, a magnetic tape drive, or an optical disk drive. Removable storage drive 414 reads from and/or writes to a removable storage unit 418 in a well-known manner. Removable storage unit 418, for example a floppy disk, magnetic tape, or optical disk, is read by and written to by removable storage drive 414. As will be appreciated, removable storage unit 418 includes a computer usable storage medium having stored therein computer software and/or data.

In alternative embodiments, secondary memory 410 may include other similar means for allowing computer programs or other instructions to be loaded into computer system 400. Such means may include, for example, a removable storage unit 422 and an interface 420. Examples of such may include a program cartridge and cartridge interface (such as that found in video game devices), a removable memory chip (such as an EPROM, or PROM) and associated socket, and other removable storage units 422 and interfaces 420 which allow software and data to be transferred from removable storage unit 422 to computer system 400.

Computer system 400 may also include a communications interface 424. Communications interface 424 allows software and data to be transferred between computer system 400 and external devices. Examples of communications interface 424 may include a modem, a network interface (such as an Ethernet card), a communications port, and a PCMCIA slot and card. Software and data transferred via communications interface 424 are in the form of signals 428 which may be electronic, electromagnetic, optical or other signals capable of being received by communications interface 424. These signals 428 are provided to communications interface 424 via a communications path (i.e., channel) 426. This channel 426 carries signals 428 and may be implemented using wire or cable, fiber optics, a phone line, a cellular phone link, an RF link and other communications channels.

In this document, the terms "computer program medium" and "computer usable medium" are used to generally refer to media such as removable storage drive 414, a hard disk installed in hard disk drive 412, and signals 428. These computer program products are means for providing software to computer system 400. The invention is directed to such computer program products.

Computer programs (also called computer control logic) are stored in main memory 408 and/or secondary memory 410. Computer programs may also be received via communications interface 424. Such computer programs, when executed, enable the computer system 400 to perform the features of the present invention as discussed herein. In particular, the computer programs, when executed, enable the processor 404 to perform the features of the present invention. Accordingly, such computer programs represent controllers of the computer system 400.

In an embodiment where the invention is implemented using software, the software may be stored in a computer program product and loaded into computer system 400 using removable storage drive 414, hard drive 412 or communications interface 424. The control logic (software), when executed by the processor 404, causes the processor 404 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art.

In yet another embodiment, the invention is implemented using a combination of both hardware and software.

The method according to the present invention allows for a highly reliable, entirely transparent process for displaying high-quality online advertising imagery. While a number of embodiments of the present invention have been described above, it should be understood that they have been presented by way of example, and not limitation. It will be apparent to persons skilled in the relevant art that various changes in form and detail can be made therein without departing from the spirit and scope of the invention. For example, while the above embodiments have focused on the application of the method according to the present invention to the display of online advertisements, the method according to the present invention also can be used to provide other forms of rich media content to a user over a computer network, as would be apparent to those of skill in the relevant art. Thus the present invention should not be limited by any of the above-described exemplary embodiments, but should be defined only in accordance with the following claims and their equivalents.

What is claimed is:

1. A method for automatically providing rich media content to a client on a computer network, comprising:
   sending a query from a server to the client regarding the ability of the client to playback said rich media content locally, said sending being automatic and being initiated by the server;
   receiving at the server a response from the client regarding the ability of the client to playback said rich media content locally, said receiving being responsive to said sending;
   comparing at the server the ability of the client to playback said rich media content locally against a predefined schedule of rich media file formats available on said network for said rich media content, said schedule comprises a preference ranking of said rich media file formats available on said network for said rich media content; and
   selecting a version of said rich media content appropriate for said ability of the client to playback said rich media content locally, said version of said rich media content comprising a rich media file, the format of said rich media file is the highest ranked of said rich media file formats available on said network for said rich media content that matched said ability to playback said rich media content locally.

2. The method of claim 1, further including sending the rich media file to the client.

3. The method of claim 1, further including receiving the entire contents of the rich media file into the local cache memory of the client.

4. The method of claim 1, wherein the rich media file format is selected from a group of rich media file formats consisting of a file format for video quality, a file format for audio quality, and a file format for speed of download.

5. The method of claim 1, further including displaying the rich media file from the local cache memory of the client responsive to determining the entire contents of the rich media file are received into the local cache memory of the client.

6. The method of claim 5, wherein the displaying includes displaying the rich media file in a designated display area.

7. The method of claim 6, wherein the designated display area includes controls for the manipulated rich media content.

8. The method of claim 7, wherein the controls include a control that enables replay of the rich media content.

9. The method of claim 7, wherein the controls include a control that is selected from a group of controls including a button control, a menu control, a voice command control, a menu bar control, a navigation bar control, and a tool bar control.

10. A system for automatically providing rich media content to a client on a computer network, comprising:
    a processor that executes control logic to cause a send of a query from a server to the client regarding the ability of the client to playback said rich media content locally, said processor to cause said send to be automatic and initiated by the server, said processor to cause a receive, at the server, of a response from the client regarding the ability of the client to playback said rich media content locally, said receive responsive to said send; and
    a memory to store rich media file formats,
    said processor to cause a retrieval of the rich media file formats from the memory and to compare, at the server, the ability of the client to playback said rich media content locally against a predefined schedule of rich media file formats available on said network for said rich media content, said schedule comprises a preference ranking of said rich media file formats available on said network for said rich media content, said processor to select a version of said rich media content appropriate for said ability of the client to playback said rich media content locally, said version of said rich media content comprising a rich media file, the format of said rich media file is the highest ranked of said rich media file formats available on said network for said rich media content that matched said ability to playback said rich media content locally.

11. The system of claim 10, wherein the processor is to cause a send of the rich media file to the client.

12. The system of claim 10, wherein the rich media file format is selected from a group of rich media file formats including a file format for video quality, a file format for audio quality, and a file format for speed of download.

13. The system of claim 10, wherein the client is to receive the entire contents of the rich media file into a local cache memory of the client.

14. The system of claim 13, wherein the client is to display the rich media file from the local cache memory of the client.

15. The system of claim 14, wherein the client is to display the rich media file in a designated display area.

16. The system of claim 15, wherein the designated display area includes controls to manipulate the rich media content.

17. The system of claim 16, wherein the controls include a control to enable replay of the rich media content.

18. The system of claim 16, wherein the controls include a control that is selected from a group of controls including a button control, a menu control, a voice command control, a menu bar control, a navigation bar control, and a tool bar control.

19. A computer program product storing control logic that, when executed by a computer system, causes the computer system to:
    send a query from a server to the client regarding the ability of the client to playback said rich media content locally, said send being automatic and being initiated by the server;
    receive at the server a response from the client regarding the ability of the client to playback said rich media content locally, said receive being responsive to said send;
    compare at the server the ability of the client to playback said rich media content locally against a predefined schedule of rich media file formats available on said network for said rich media content, said schedule comprises a preference ranking of said rich media file formats available on said network for said rich media content; and
    select a version of said rich media content appropriate for said ability of the client to playback said rich media content locally, said version of said rich media content comprising a rich media file, the format of said rich media file is the highest ranked of said rich media file formats available on said network for said rich media content that matched said ability to playback said rich media content locally.

20. A system for automatically providing rich media content to a client on a computer network, comprising:
    a first means, that executes control logic, for causing a send of a query from a server to the client regarding the ability of the client to playback said rich media content locally, said first means to cause said send to be automatic and initiated by the server, said first means to cause a receive, at the server, of a response from the client regarding the ability of the client to playback said rich media content locally, said receive responsive to said send; and a second means for storing rich media file formats, said first means to cause a retrieval of the rich media file formats from the second means and to compare, at the server, the ability of the client to playback said rich media content locally against a predefined schedule of rich media file formats available on said network for said rich media content, said schedule comprises a preference ranking of said rich media file formats available on said network for said rich media content, said first means to select a version of said rich media content appropriate for said ability of the client to playback said rich media content locally, said version of said rich media content comprising a rich media file, the format of said rich media file is the highest ranked of said rich media file formats available on said network for said rich media content that matched said ability to playback said rich media content locally.

* * * * *

UNITED STATES PATENT AND TRADEMARK OFFICE
CERTIFICATE OF CORRECTION

PATENT NO. : 7,421,482 B2
APPLICATION NO. : 11/184774
DATED : September 2, 2008
INVENTOR(S) : Armstrong et al.

It is certified that error appears in the above-identified patent and that said Letters Patent is hereby corrected as shown below:

In column 3, line 65, delete "GWF" and insert -- GIF --, therefor.

In column 4, line 57, delete "GWF" and insert -- GIF --, therefor.

In column 4, line 65, delete "interstital" and insert -- interstitial --, therefor.

In column 5, line 21, delete "Overalls" and insert -- Overall, --, therefor.

In column 6, line 57, after "media" delete ",".

Signed and Sealed this

Sixteenth Day of December, 2008

JON W. DUDAS
*Director of the United States Patent and Trademark Office*